Sept. 30, 1941.　　　E. F. ROMNEY　　　2,257,192
COMBINATION DISHWASHER AND DRAINER
Filed Nov. 7, 1939
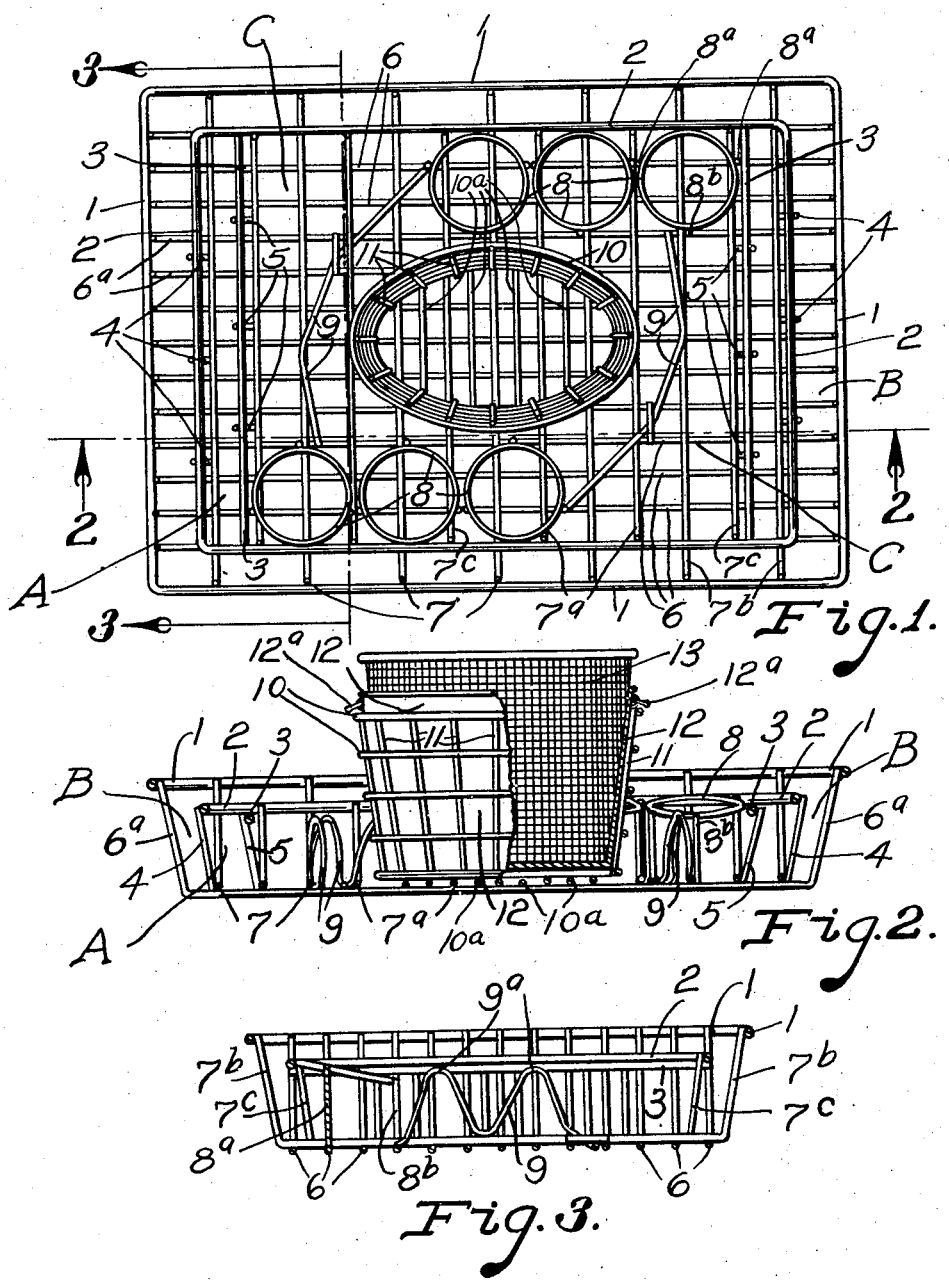
INVENTOR.
Estelle F. Romney
BY A. B. Bowman
ATTORNEY.

UNITED STATES PATENT OFFICE 2,257,192

COMBINATION DISHWASHER AND DRAINER

Estelle F. Romney, San Diego, Calif.

Application November 7, 1939, Serial No. 303,238

4 Claims. (Cl. 141—9)

My invention relates to a combination dishwasher and drainer and the objects of my invention are:

First, to provide a combination dishwasher and drainer of this class which is adapted to support various shaped utensils in separate orderly arrangement for washing and draining said utensils;

Second, to provide a combination dishwasher and drainer of this class in which is centrally positioned a liquid containing receptacle for holding hot water for washing purposes;

Third, to provide a combination dishwasher and drainer of this class in which dishes are supported with their edges extending upwardly therefrom permitting said dishes to be turned and washed by means of a mop and hot water in a receptacle positioned centrally therein;

Fourth, to provide a dishwasher and drainer of this class in which a liquid receptacle is adapted to receive a foraminous receptacle in which silverware or the like is positioned so that said silverware is washed in said liquid containing receptacle and removed therefrom and drained in said foraminous receptacle;

Fifth, to provide a combination dishwasher and drainer of this class which is adapted to support all the utensils used with the average meal, thereby permitting the removal of all of said utensils at one time on my combination dishwasher and drainer, thus eliminating a number of trips to and from the table when cleaning away the dishes after meals; and Sixth, to provide a combination dishwasher and drainer of this class which is very simple and economical of construction, very efficient, easy to operate and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a top or plan view of my combination dishwasher and drainer showing parts removed therefrom to facilitate the illustration; Fig. 2 is a longitudinal sectional view taken from the line 2—2 of Fig. 1 showing portions broken away and in section to facilitate the illustration and Fig. 3 is a transverse sectional view taken from the line 3—3 of Fig. 1.

Similar characters of reference refer to similar parts and portions throughout the several views of the drawing:

The outer frame member 1, inner frame member 2, transverse frame members 3, inner frame member supports 4, transverse frame member supports 5, longitudinal wires 6, lateral wires 7, drinking cup supporting members 8, drinking glass supporting members 9, receptacle supporting frame members 10 and 11, liquid containing receptacle 12 and the foraminous receptacle 13 constitute the principal parts and portions of my combination dishwasher and drainer.

The outer frame member 1 is an endless member and is formed into a substantially rectangular shape and is supported at its shortest opposite sides on the upwardly extending portions 6a of the longitudinal wires 6, as shown best in Fig. 2 of the drawing. It is supported at its longest opposite sides on the upwardly extending portions 7b of the lateral wires 7, as shown best in Fig. 3 of the drawing. It will be noted that this outer frame member 1 is secured to the upwardly extending end portion 6a and 7b of the longitudinal wires 6 and the lateral wires 7 by means of welding, brazing or otherwise. The lateral wires 7 are positioned on the upper side of the longitudinal wires 6 in crossed relation thereto and said longitudinal wires and said lateral wires are secured together by welding, brazing, or otherwise.

The inner frame member 2 is an endless member and is formed into a substantially rectangular shape and is supported at its shortest opposite sides on the upper ends of the inner frame member supports 4. These inner frame member supports 4 are secured at their lower ends by means of welding, brazing or otherwise on the lateral wires 7, as shown best in Figs. 1 and 2 of the drawing. This inner frame member 2 is supported at its longest opposite sides on the upwardly extending end portions 7c of the lateral wires 7a, which are positioned intermediate the lateral wires 7 and parallel thereto, as shown best in Fig. 1 of the drawing.

Secured to the inner frame member 2 parallel to the shortest opposite sides thereof in slightly spaced relation thereto are the transverse frame members 3, shown best in Figs. 1 and 2 of the drawing. Said transverse frame members 3 are supported on the upper ends of the transverse frame member supports 5 and the lower ends of said members 5 are secured on the lateral wires 7a, as shown best in Fig. 1 of the drawing.

The drinking cup supporting members 8 are substantially ring shaped and are positioned tangent to opposite sides of the inner frame member 2 and are supported in slightly inclined relation with said member 2, as shown best in Fig. 3 of the drawing. Each of these drinking cup supporting members 8 are provided with supporting members 8a at opposite sides thereof and a supporting member 8b positioned at the opposite side thereof from the inner frame member 2, said supporting members 8a and 8b being secured at their lower ends to the longitudinal wires 6, as shown best in Figs. 1 and 2 of the drawing.

The drinking glass supporting members 9 are each provided with a plurality of upwardly extending loop portions 9a as shown best in Fig. 3 which are arranged to support an inverted drinking glass thereon.

The supporting frame members 10 are substantially elliptical in shape when looking downwardly thereon and are supported at their inner sides on the substantially upright receptacle supporting frame members 11, as shown best in Figs. 1 and 2 of the drawing. Secured to the lower member 10 are several transverse wires 10a, which added to the wires 7 form a bottom for the structure formed by the members 10 and 11, as shown in Fig. 2 of the drawing. These receptacle supporting frame members 10 and 11 form a substantially basket shaped container in which is removably positioned the liquid containing receptacle 12. This receptacle 12 is of conforming shape to the inner side of said basket shaped container comprised of the members 10 and 11 and is provided with two outwardly extending handle portions 12a, as shown best in Fig. 2 of the drawing.

Removably positioned within said liquid containing receptacle 12 is a foraminous receptacle 13 which is made of screen wire or the like and is of conforming shape with the inner side of said liquid containing receptacle 12.

It will be noted that all connecting parts hereinbefore described, with the exception of the receptacles 12 and 13 are secured together by means of welding, brazing or otherwise, substantially as shown in Fig. 1 of the drawing.

The operation of my combination dishwasher and drainer is substantially as follows:

When clearing away the dishes from a table after a meal, my combination dishwasher and drainer may be carried to said table and said dishes may be placed on my combination dishwasher and drainer and removed from the table in one trip. Silverware is placed in the foraminous receptacle 13 along with other small utensils, while the cups and glasses are supported on the drinking cup supporting members 8 and drinking glass supporting members 9 respectively, the drinking cups being supported right side up, with a portion of the cups extending downwardly through the drinking cup supporting members 8 and the drinking glasses are inverted and placed on the loop portions 9a of the drinking glass supporting members 9. Small plates and saucers are positioned between transverse frame members 3 and the inner frame member 2 as shown at A in Figs. 1 and 2 of the drawing, and large plates and platters are supported at the outer side of the inner frame member 2 and adjacent the outer frame member 1, as shown at B in Figs. 1 and 2 of the drawing. Other plates and dishes may be stacked in the position as indicated at C in Fig. 1 of the drawing. The receptacles 12 and 13 are in substantially the position as shown in Fig. 2 of the drawing and the liquid containing receptacle 12 is partially filled with hot soapy water and the silverware and other utensils in the foraminous receptacle 13 are thereby washed and cleansed and said foraminous receptacle 13 may be removed from the liquid containing receptacle 12 together with said silverware which may be reused by pouring hot water thereon and left to dry. The hot soapy water remaining in the liquid containing receptacle 12 is used to wash the other dishes by means of a dishmop or the like. The larger dishes in the position as indicated at B may be turned around as they are washed and the glasses and cups, together with the other dishes may be washed in a like manner with a dishmop and hot water in said liquid containing receptacle 12. When the dishes are thoroughly washed they may be rinsed, if desired and left to remain in my combination dishwasher and drainer until dry.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a combination dishwasher and drainer of the class described, the combination of an outer frame member and an inner frame member positioned in conforming spaced relation therewith, longitudinal and lateral wires supporting said outer and inner frame members, a basket like receptacle supporting frame connected with said longitudinal and lateral wires, and a liquid containing washing receptacle supported by said receptacle supporting frame.

2. In a combination dishwasher and drainer of the class described, the combination of an outer frame member and an inner frame member positioned in conforming spaced relation therewith, longitudinal and lateral wires supporting said outer and inner frame members, a basket like receptacle supporting frame connected with said longitudinal and lateral wires, a liquid containing washing receptacle supported by said receptacle supporting frame, and a foraminous receptacle supported in said liquid containing washing receptacle.

3. In a combination dishwasher and drainer of the class described, the combination of a plurality of longitudinal wires, a plurality of lateral wires connected therewith, a basket consisting of receptacle supporting members supported on said longitudinal and lateral wires, and a liquid containing receptacle removably positioned in said basket.

4. In a combination dishwasher and drainer of the class described, the combination of a plurality of longitudinal wires, a plurality of lateral wires connected therewith, a basket consisting of receptacle supporting members supported on said longitudinal and lateral wires, a liquid containing receptacle removably positioned in said basket, and a foraminous receptacle removably positioned in said liquid containing receptacle.

ESTELLE F. ROMNEY.